United States Patent [19]
Taylor

[11] Patent Number: 5,456,559
[45] Date of Patent: Oct. 10, 1995

[54] CUTTING AND BEVELING DEVICE

[76] Inventor: Glen S. Taylor, 4029 Hickman Rd., Kodak, Tenn. 37764

[21] Appl. No.: 261,818

[22] Filed: Jun. 17, 1994

[51] Int. Cl.[6] .................................................... B23C 1/20
[52] U.S. Cl. ................ 409/137; 144/134 B; 144/252 R; 409/138; 409/182; 409/219
[58] Field of Search ....................... 409/137, 138, 409/175, 181, 182, 183, 197, 190, 219; 144/134 A, 145 A, 134 B, 252 R, 252 A

[56] References Cited

U.S. PATENT DOCUMENTS

| | | | |
|---|---|---|---|
| 2,595,483 | 5/1952 | Petter | 144/252 R |
| 3,418,883 | 12/1968 | Leibow | 409/138 |
| 3,450,001 | 6/1969 | Fortune | 409/182 |
| 3,770,031 | 11/1973 | Olson | 144/134 B |
| 4,027,575 | 6/1977 | White | 90/12 D |
| 4,281,694 | 8/1981 | Gorman | 409/182 |
| 4,304,276 | 12/1981 | Termini | 144/253 J |
| 4,735,531 | 4/1988 | Boerckel et al. | 409/182 |
| 4,787,786 | 11/1988 | Freud et al. | 409/180 |
| 4,895,483 | 1/1990 | Anderson | 409/137 |
| 5,044,843 | 9/1991 | Velepec | 409/126 |
| 5,094,575 | 3/1992 | Kieser et al. | 409/182 |
| 5,144,737 | 9/1992 | Riesmeier | 29/564.7 |
| 5,146,965 | 9/1992 | Gibson | 144/372 |

*Primary Examiner*—Daniel W. Howell
*Attorney, Agent, or Firm*—Pitts & Brittian

[57] ABSTRACT

A cutting and beveling device for simultaneously cutting and beveling a selected work piece. The cutting and beveling device includes a work table and a support assembly secured to the work table. The work table defines a work surface for supporting the work piece. The support assembly supports a router in a manner such that the router is suspended over the work surface and is movable in a linear direction between the ends of the work table. The router receives a bit configured to cut and bevel simultaneously. The work table includes a slotted opening which receives shavings resulting from the cutting and beveling operation. The work table also includes a vacuum system for removing dust and particles resulting from the cutting and beveling operation.

15 Claims, 6 Drawing Sheets

CUTTING AND BEVELING DEVICE

TECHNICAL FIELD

This invention relates to the field of combination cutting and beveling devices particularly suitable for simultaneously cutting and beveling laminated plastic sheets.

BACKGROUND ART

Laminated plastic sheet material is widely used in the advertising field because it is sturdy but is easily cut and engraved for a variety of desirable effects. Usually, a two step process is necessary to cut and finish the laminated sheet. First, the laminate sheet is cut to the desirable size with a jig saw, table saw, shear or the like. Second, the edges are finished with a router employing a beveling bit.

Several devices have been produced to trim or cut the edge of a laminated sheet of plastic. Typical of the art are those devices disclosed in U.S. Pat. No. 4,027,575 issued to K. N. White on Jun. 7, 1977; U.S. Pat. No. 4,304,276 issued to A. Termini on Dec. 8, 1981; and U.S. Pat. No. 4,787,786 issued to Freud et al. on Nov. 29, 1988. Each of these patents teaches a device which is used to edge or trim an edge of laminated plastic. None of these devices are intended to be used to simultaneously and precisely cut and edge or bevel a stock sheet of laminated plastic to a desirable size. A means for securely holding the work piece during the cutting or edging operation is not taught. Further, none of these devices provides a location for the resulting particles, dust and shavings to fall or to be removed such that the particles do not interfere with cutting or edging operation.

Therefore, it is an object of this invention to provide a cutting and beveling device which can simultaneously cut and bevel laminated plastic.

It is another object of the present invention to provide a cutting and beveling device which provides a work surface to which a selected work piece can be securely held.

It is yet another object of the present invention to provide a cutting and beveling device which defines a device for removing the shavings from the work piece during the cutting and beveling operation.

DISCLOSURE OF THE INVENTION

Other objects and advantages will be accomplished by the present invention which serves to provide a cutting and beveling device which can simultaneously cut and bevel a selected work piece. The cutting and beveling device of the present invention includes a work table to which a support assembly is secured. The work table defines a platform which is fabricated to provide a work surface to which the selected work piece can be securely held during the cutting and beveling operation. The support assembly supports a router in a manner such that the router is suspended above the work surface. The router is movable in a linear direction between the ends of the work table. The router receives a bit which is configured to cut and bevel simultaneously. A slotted opening is incorporated into the work table below the router for receiving shavings which result from the cutting and beveling operation. A vacuum system is included in the work table and is utilized to remove shavings from the shaving slot and from above the work piece.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

A cutting and beveling device for simultaneously cutting and beveling a sheet of laminated plastic incorporating various features of the present invention is illustrated generally at 10 in the figures. Moreover, in the preferred embodiment the cutting and beveling device 10 is designed to simultaneously cut and bevel a selected work piece. The cutting and beveling device 10 is designed to securely hold the work piece during the cutting and beveling operation. The cutting and beveling device 10 is also designed to remove any debris which results from the cutting and beveling operation.

The cutting and beveling device 10 generally includes a work table 12 to which a support assembly 30 is secured. The work table 12 is configured to support a selected work piece 58. The support assembly 30 supports a router 52, in a suspended fashion, above the work table 12. The support assembly 30 guides the router 52 and limits its movement to a linear direction. The router 52 receives a cutter/beveler bit 54 in a customary manner.

In the preferred embodiment, the work table 12 defines a frame 15, a platform 13 which is secured to the frame 15, a set of guides 18 which are located at each end 16, 17 of the work table 12 and a slotted opening 20 for receiving shavings 70 created during the cutting and beveling of a selected work piece. Further, in the preferred embodiment, adjustable footing screws 86 are positioned on the bottom of the work table 12 at each corner of the frame 15 for leveling the work table 12.

The platform 13 defines a work surface 14 upon which a selected work piece is placed. Preferably, the platform 13 is at least 50 inches in length, to accommodate a typical sheet of plastic laminate stock which is approximately 24"×48".

Figure 1:
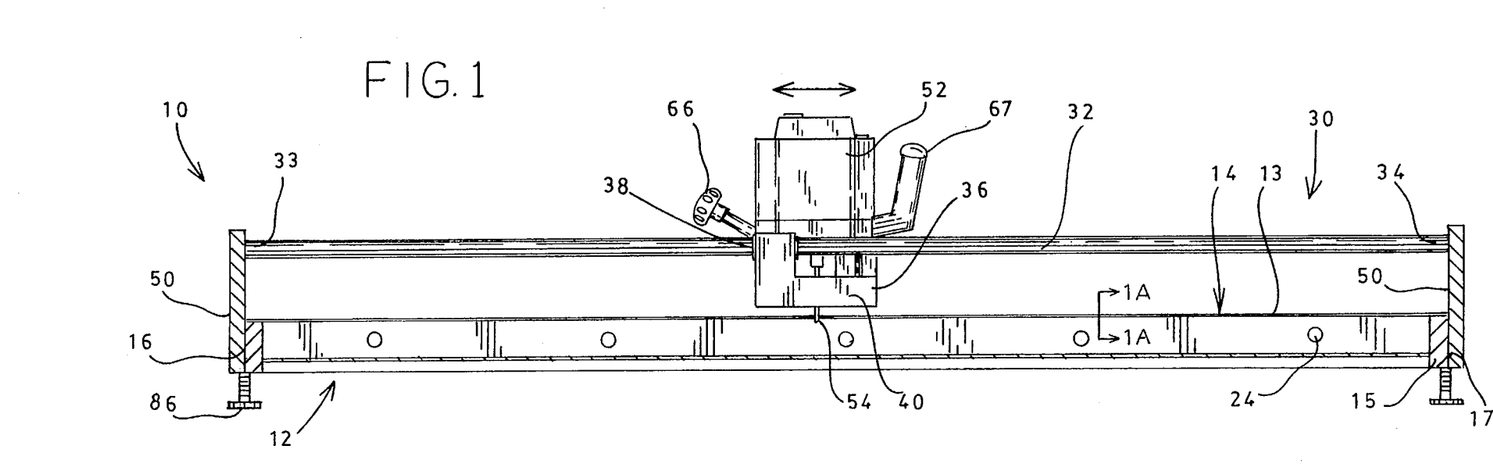
FIG. 1 is a side view, partially in section of the cutting and beveling device constructed in accordance with several features of the present invention.
Figure 1A:
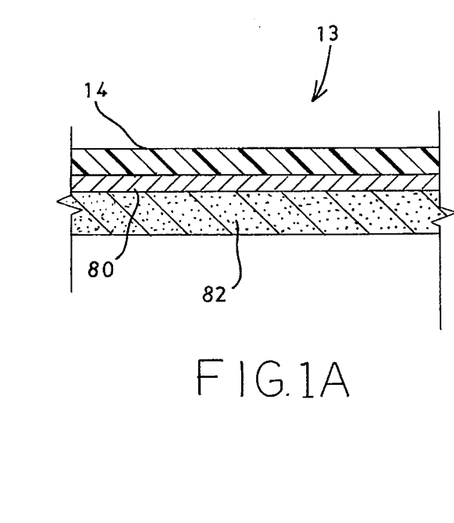
FIG. 1a is a cross sectional view of the platform.
Figure 5:
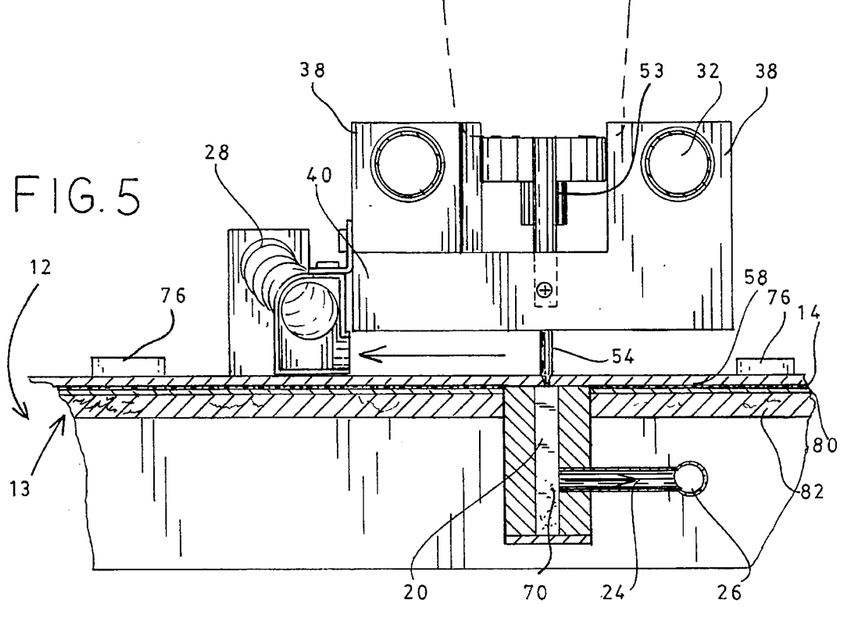
FIG. 5 is an end elevational view, partially in section, of the cutting and beveling device of FIG. 1.

Further, the platform 13 is fabricated in a manner such that magnets are strongly attracted to the work surface 14. Preferably, the platform 13 is comprised of three layers which are laminated together. The work surface 14 or top layer is a 14 millimeter layer of plastic, the second layer 80 is fabricated from a sheet of 20 gauge metal and the third and bottom layer 82 is one-half inch fiber board, as shown in FIG. 1a and 5. The layer of plastic of the work surface 14 protects the layer of metal. The bottom layer 82 provides strength to the work surface 14.

Figure 2:
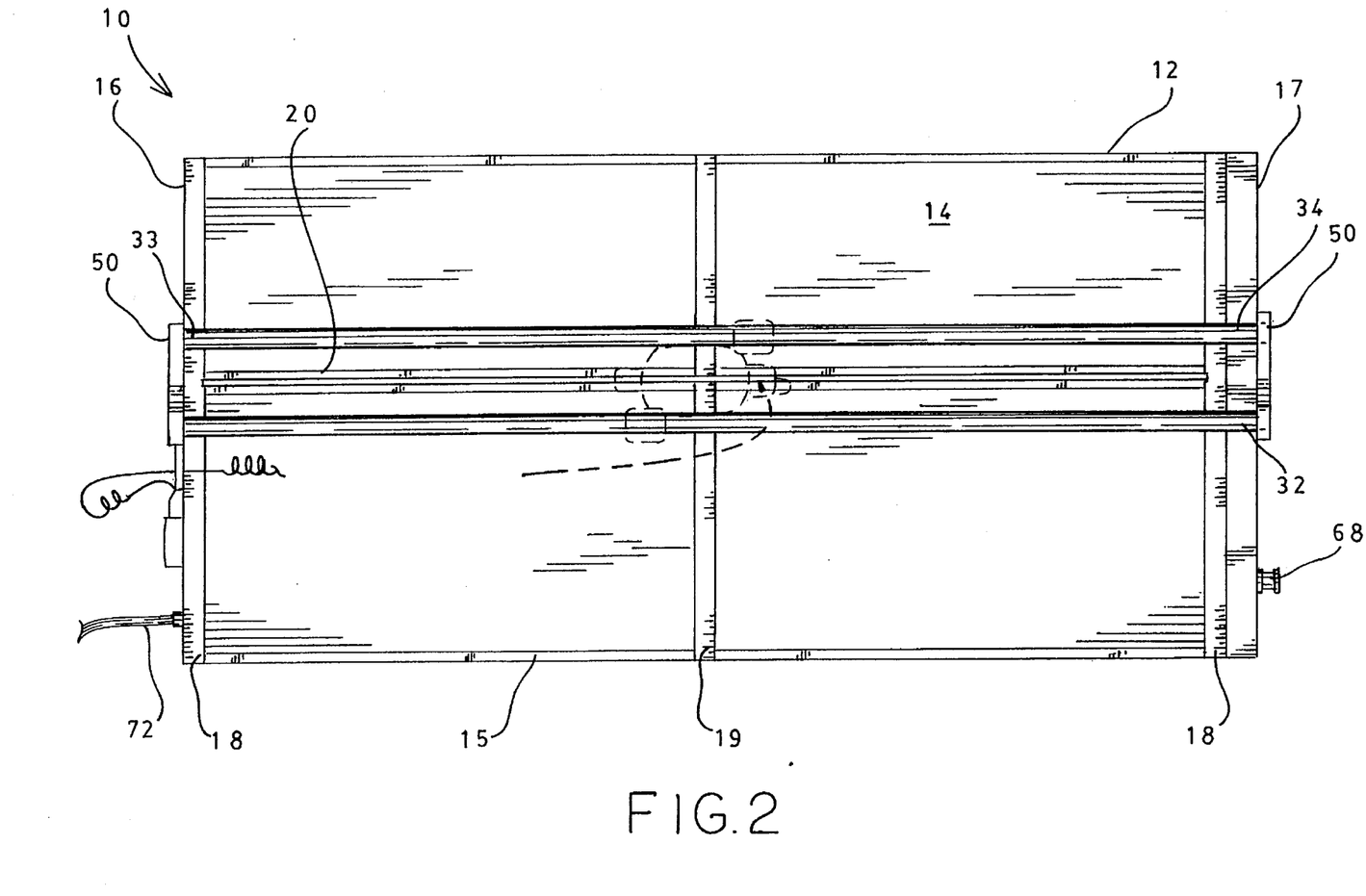
FIG. 2 illustrates a top plan view of the cutting and beveling device of FIG. 1.

The set of guides 18 secured to each end 16, 17 of the work table 12 provides a measurement guide and a straight edge, as shown in FIG. 2. The guides 18 are utilized to properly align a work piece 58 for a precise cut. Moreover, the guides 18 provide a straight edge which is perpendicular to cutting plane such that a straight cut is made. Further, it is preferable to include a central measurement guide 19 proximate a central portion of the work table 12 to assure straight measurements. The central measurement guide 19 is flush with the work surface 14 such that the work piece 58 lies flat on the work surface 14.

The slotted opening 20, shown clearly in FIG. 2, extends into the interior of the work table 12 and runs the length of the work table 12 below the router 52 and router bit 54. The slotted opening 20 receives the shavings 70 which come off the work piece 58 during the cutting/beveling operation.

As stated above, the support assembly 30 is secured to the work table 12 and supports the router 52 above the work surface 14. In the preferred embodiment, the support assembly 30 is comprised of a set of support rods 32, a set of support rod mounting brackets 50 and a router mounting assembly 36. The ends 33, 34 of the support rods 32 are secured to opposing ends 16, 17 of the work table 12 via the set of support rod mounting brackets 50 in a manner such that the support rods 32 are parallel and suspended above the work table 12, as shown in FIG. 1. The upper end of each of the support rod mounting brackets 50 is configured to receive a respective end 33, 34 of the support rods 32. The lower end of each of the support rod mounting brackets 50 is secured to the frame 15 at respective ends of the work table 12. The support rods 32 are suspended approximately 3–4 inches above the work surface 14. In the preferred embodiment, the support rods are manufactured from ground and polished steel with a chrome finish.

It will be noted that the support rods 32 can be configured such that the ends of the support rods are L-shaped. In this manner, the ends of the support rods 32 can be directly secured to the work table 12.

In the preferred embodiment, the router mounting assembly 36 defines a support plate 40 and a set of rod receivers 38 which extend from the top of the support plate 40, as shown in FIG. 5.

The support plate 40 is configured such that the router 52 can be fixedly secured thereto. In the preferred embodiment, a set of router support posts 46 are used to secure the router 52 to the support plate 40. The first end 47 of each of the router support posts 46 is secured within the end openings 42 of the support plate 40, which are shown clearly in FIG. 4. The second end 48 of each of the router support posts 46 is secured to the router 52 thereby supporting the router 52, as shown most clearly in FIGS. 6 and 7. The support plate 40 defines a central opening 44 through which the cutter/beveler bit 54 is received for cutting and beveling a work piece 58 firmly held on the work surface 14 below. It will be noted that any means for securing the router to the router support plate would be suitable.

Figure 4:
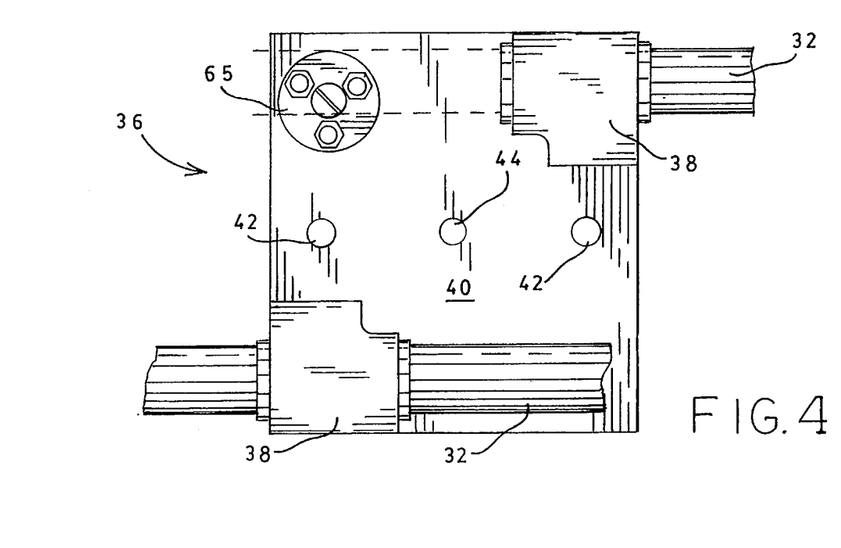
FIG. 4 is a top plan view of the router mounting assembly.

The set of rod receivers 38 are configured to slidably receive the support rods 32 such that the router mounting assembly 36 is slidable along the support rods 32 between the ends 16, 17 of the work table 12. The support rods 32 limit the movement of the router mounting assembly 36 to a linear direction, as indicated by the arrow in FIG. 1. As shown in FIGS. 4 and 5, the rod receivers 38 extend from the top of the support plate 40 catercorner to each other. In this manner the router mounting assembly 36 is supported in a balanced manner thereby providing a balanced support plate 40 upon which the router 52 is mounted. It will be noted that, in an alternate embodiment, the rod receivers 38 can run the length of the support plate 40. Preferably, the router mounting assembly 36 is manufactured from aluminum which is easily milled to accommodate the router.

It is preferable that the router mounting assembly is suspended approximately ¼ inch above the work surface such that the user's fingers can not become lodged under the support plate 40 thereby preventing injury.

In an alternate embodiment (not shown), the support assembly 30 can support the router mounting assembly with a single support rod. In this embodiment, the support rod can not have a smooth circular configuration as described above. For example, the support rod can define a circular toothed configuration or a rectangular, triangular configuration, etc. The rod receiver of router mounting assembly is configured to closely receive the support rod such that the router mounting assembly can not rotate with respect to the support rod. Further, the rod receiver must receive the support rod in a manner such that the router is supported in a balanced manner.

Figure 6:
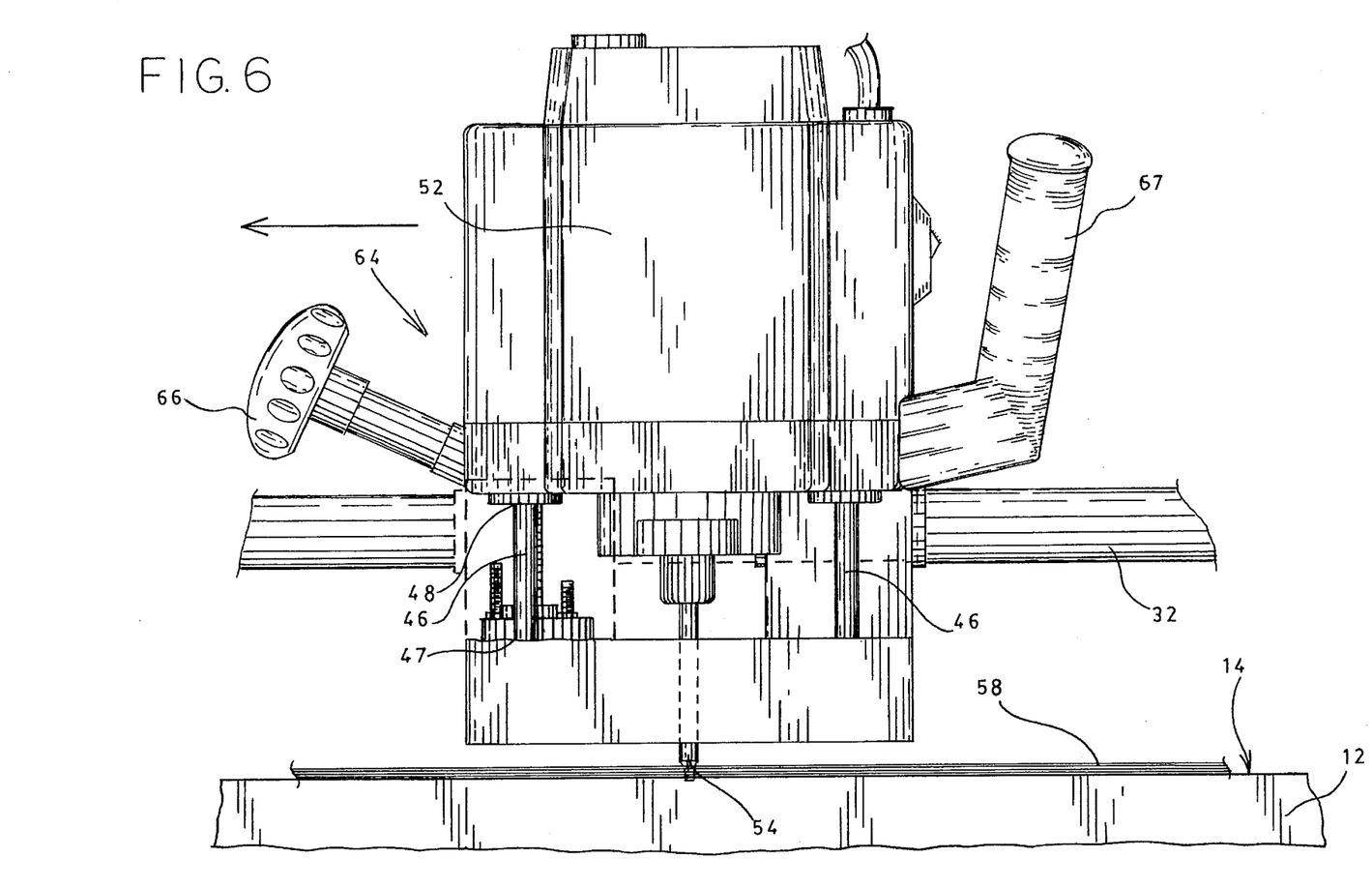
FIG. 6 is a side elevational view of the router and router mounting assembly.
Figure 7:
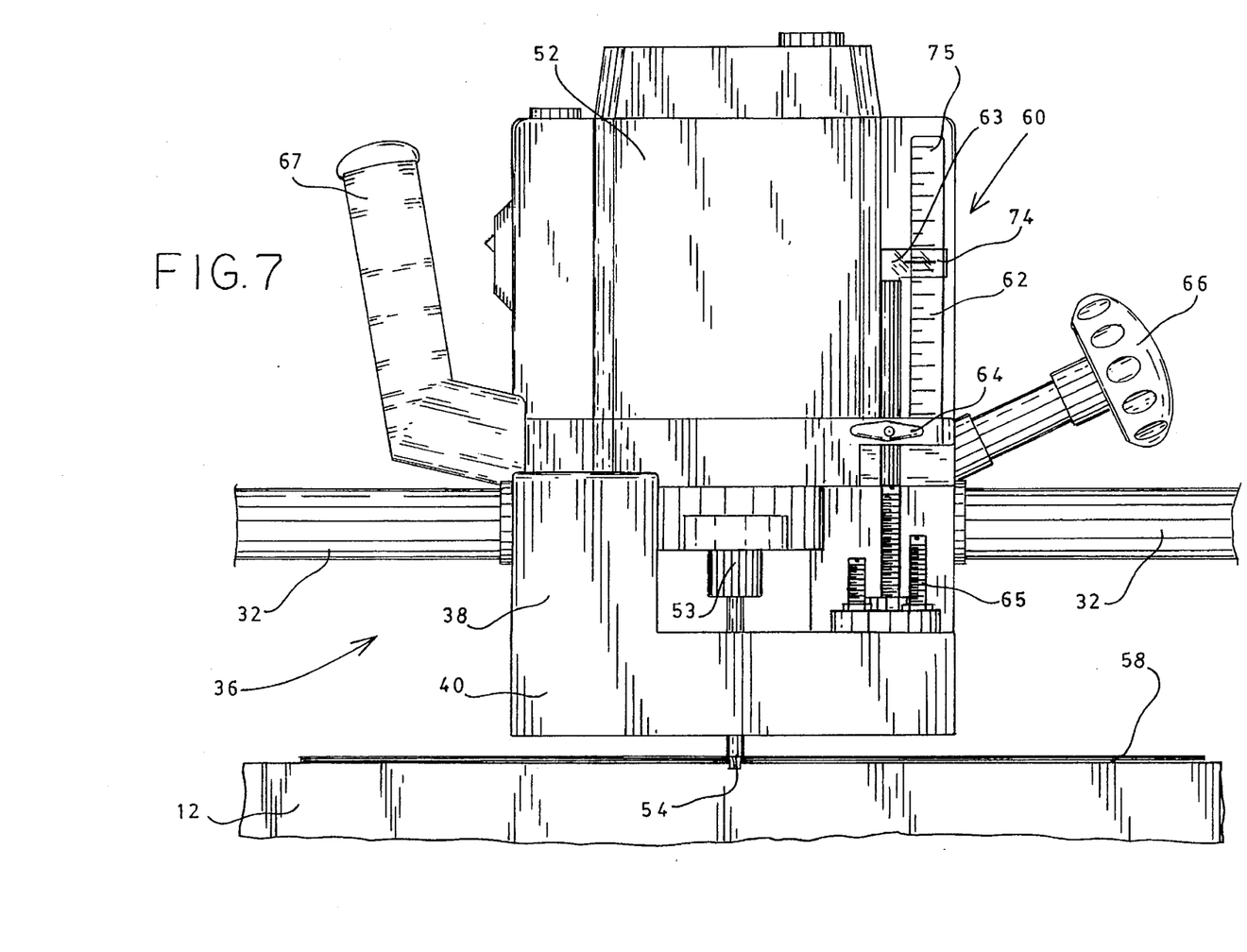
FIG. 7 is a side elevational view of the router and router mounting assembly.

The router 52 mounted on the support plate 40 of the router mounting assembly 36 is a typical router available in the field. In the preferred embodiment, a Dewalt #615 router is employed. As shown in FIGS. 6 and 7, the router 52 defines a collet 53 for supporting the cutter/beveler bit 54. Further, the router 52 defines a depth gauge assembly 60 and at least one handle 67 for moving the router 52.

The depth gauge assembly 60 is for setting and controlling the depth the router bit 54 will cut. The depth gauge assembly 60 is shown in FIG. 7 and includes a scale 62, a movable guide 63, a locking device 64, a preset guide 65 and a router releasing knob 66. The scale 62 is mounted on the router 52 and shows incremental marks 75. The movable guide 63 has an indicator 74. The movable guide 63 and the scale 62 are movable relative to each other. The preset guide 65 is set at typical height to which the router 52 is set for the cutting and beveling operation. The preset guide 65 rotates such that a selected height is rotated to rest under the movable guide 63. The locking device 64 is released to allow the movable guide 63 to rest on the preset guide 65 at which time the locking device 64 is locked. The router 52 is released by unscrewing the knob 66, the height of the router 52 is raised or lowered such that the incremental mark 75 of the router 52 indicating the selected preset height is aligned with the indicator 74 of the movable guide 63, then the knob 66 is secured to set the router 52.

Figure 8:
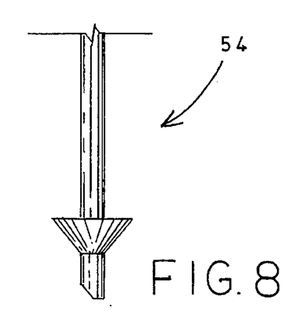
FIG. 8 is a side view of a conventional cutting/beveling bit.
Figure 8A:
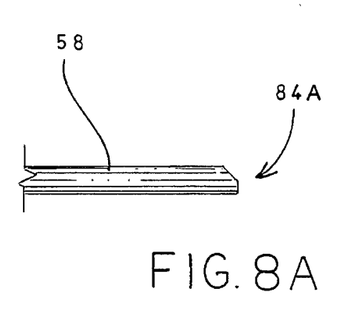
FIG. 8a is a side view showing a profile of a selected work piece beveled and cut using the cutting/beveling bit of FIG. 8 set at a selected height.
Figure 8B:
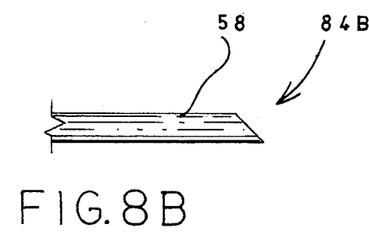
FIG. 8b is a side view showing a profile of a selected work piece beveled and cut using the cutting/beveling bit of FIG. 8 set at an alternate height.

A typical cutter/beveler bit 54 is shown in FIG. 8. The cutter/beveler bit 54 is a unitary bit defining a blade 56 configured to cut and bevel simultaneously. More specifically, the blade 56 defines at least a portion which is tapered in some manner. It will be noted that cutter/beveler bits with different blade configurations can be utilized to provide a different profile. Further, the depth to which the router 52 is set will control the profile 84 of the edge of work piece 58. For example, the profiles 84a, 84b of the work pieces 58 shown in FIGS. 8*a* and 8*b* were produced by the cutter/beveler bit 54 of FIG. 8. The router 52 was raised higher away from the work piece 58 for the profile 84*a* shown in FIG. 8*a*.

The cutter/beveler bits 54 used in the router 52 of the present invention are typical quarter inch bits except that the length of the bit needs to be at least 3½" to provide enough length for the cutting action. Typical beveler bits are only about two inches. The cutter/beveler bit 54 is secured within the router 52 in the usual manner.

Before operating the cutting and beveling device 10, the cutter/beveler bit 54 is raised by raising the router 52 to a position such that the stock or work piece 58 is not obstructed from proper placement upon the work surface 14. The work piece 58 is placed on the work surface 14 and rested squarely against the one of the guides 18.

To ensure a straight cut, the work piece 58 must be held securely in place such that it will not move during the cutting/beveling operation. In the preferred embodiment, magnets 76 are utilized to firmly hold the work piece 58 in place. The second layer 80 of the platform 13 is metal and to which the magnets 76 are strongly attracted. The magnets 76 can be placed in one of two ways. The magnets 76 can be situated on either side of the work piece 58 at intervals running the length of the work piece 58. Alternatively, the magnets 76 can be placed on the surface of the work piece 58 at intervals running the length of the work piece 58, as shown in FIG. 5. In this situation, the magnets 76 must be strongly attracted to the work surface 14 through the work piece 58. The magnets 76 must be placed on the work piece 58 where they do not obstruct the movement of the router 52 or router mounting assembly 36. Using magnets 76 to hold the work piece 58 during the cutting/beveling operation ensures a straight cut. In the field of laminates, if the cut is off by even a small amount the cut piece will be rendered useless.

It is anticipated that electromagnets can be utilized wherein once the work piece is situated the electromagnets are turned on to securely hold the work piece in place. Once the cutting/beveling operation is completed the electromagnets are turned off thereby releasing the work piece.

Once the work piece 58 is situated and secured in place, the router 52 is lowered to the desired cutting/beveling position. The router 52 is turned on and moved, by pushing or pulling the router 52 via the handle 67 of the router 52. The router mounting assembly 36, to which the router 52 is mounted, is limited to linear movement along the support rods 32. The router 52 is moved from one end 16 of the work table 12 to the other 17 thereby simultaneously cutting and beveling the work piece 58. Shavings 70 resulting from the cutting/beveling operation fall into the slotted opening 20.

In the preferred embodiment, a vacuum system 22 is incorporated into the cutting and beveling device 10 to provide a means for removing the shavings 70 or particles resulting from the cutting and beveling operation. In the preferred embodiment, as shown in FIG. 1, the vacuum system 22 includes a plurality of vacuum conduits 24 equally spaced along the length of the work table 12 and in communication with the slotted opening 20. As shown most clearly in FIG. 3, the plurality of vacuum conduits 24 lead to a main conduit 26 which leads out of the table 12 and into the vacuum (not shown). Further, in the preferred embodiment, the vacuum system 22 includes a vacuum hose 28 which is mounted on the router mounting assembly 36 for removing shavings and particles 70 from above the work piece 58, as shown in FIG. 5. In an alternate embodiment (not shown), brushes may be secured to the support plate 40 and extend downward therefrom. The brushes would prevent any particles above the work piece 58 from flying out and injuring the user.

Figure 3:
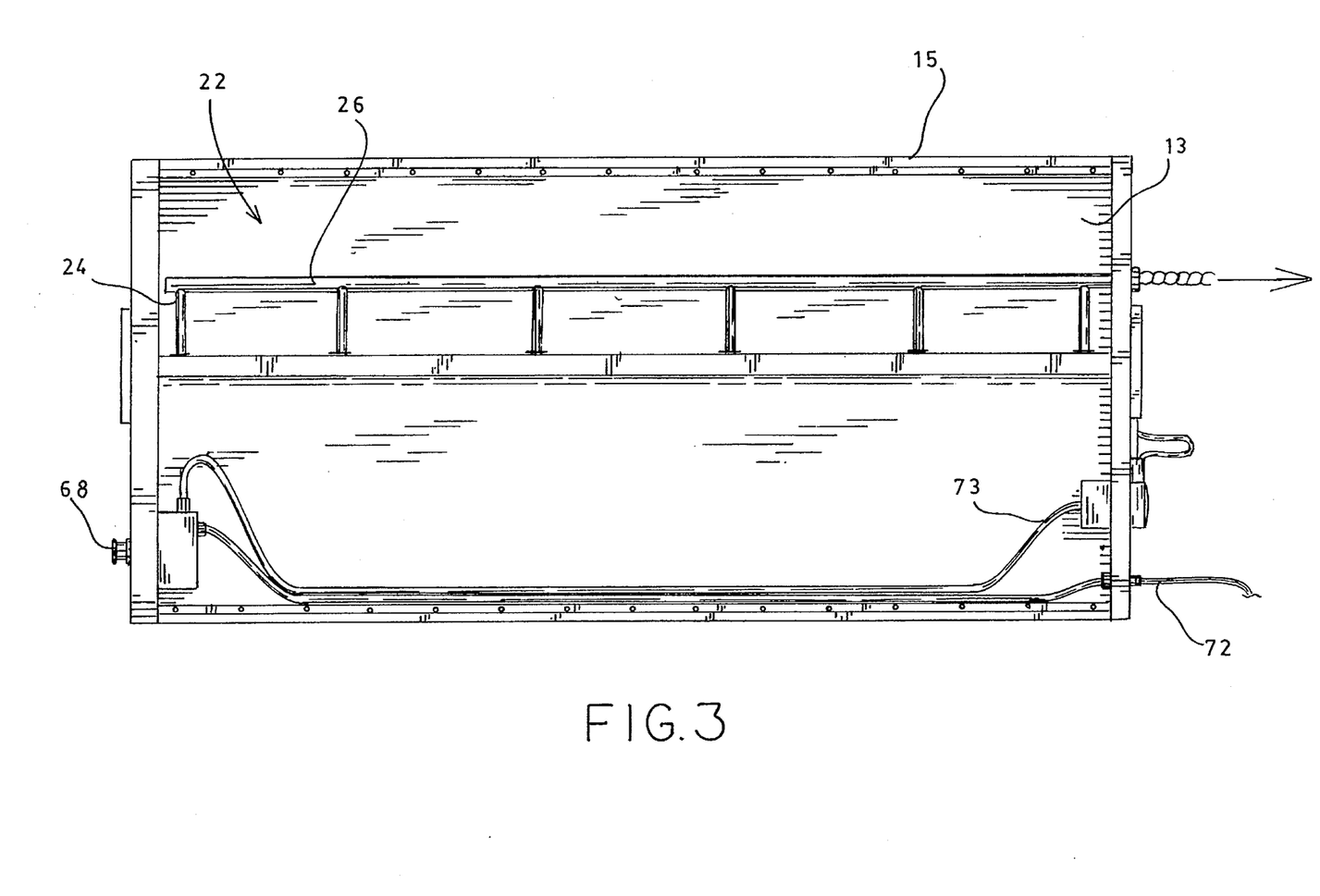
FIG. 3 is a bottom plan view of the cutting and beveling device of FIG. 1.

Moreover, in the preferred embodiment, a main power switch 68 is incorporated into the work table 12 to which the router 52 and the vacuum system 22 are electrically connected such that one switch powers the cutting and beveling device 10. As shown in FIG. 3, a main power cord 72 leads from the exterior of the work table 12 and is in electrical communication with the main power switch 68. A power cord 73 which is in electrical communication with the vacuum system 22 and the router 52 is also in electrical communication the main power switch 68. It is also preferable to include a surge protector (not shown) for protecting the system from electrical surges.

It will be noted that the cutting and beveling device 10 is not limited solely to use with cutter/beveler bits. Further, it will be noted that the work piece 58 can be a material other than laminated plastic sheets. The cutting and beveling device 10 disclosed is not intended to be limited to use with laminated plastic. With appropriate adjustments made for alternate materials, the cutting and beveling device would be suitable for simultaneously cutting and beveling a variety of materials such as wood or metal.

From the foregoing description, it will be recognized by those skilled in the art that a cutting and beveling device offering advantages over the prior art has been provided. Specifically, the cutting and beveling device simultaneously cuts and bevels a selected work piece. Further, the cutting and beveling device provides a work surface to which the work piece can be securely held during the cutting and beveling operation. Also, the cutting and beveling device provides a device for removing shavings and dust resulting from the cutting and beveling operation.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A cutting and beveling device for cutting and beveling a work piece, said cutting and beveling device supporting a router to which a bit is releasably secured, said cutting and beveling device comprising:

a work table defining a first end, a second end, a slotted opening, a vacuum system and a platform, said platform defining a work surface for supporting the work piece, said slotted opening extending between said first end and said second end of said work table proximate a center of said work table below a linear path of said bit, said slotted opening for receiving at least a portion of the shavings resulting from the work piece being cut and beveled, said vacuum system for removing said at least a portion of the shavings received in said slotted opening, said vacuum system includes a plurality of vacuum conduits in communication with said slotted opening for removing said at least a portion of the shavings received in said slotted opening, each of said plurality of vacuum conduits being configured to permit free passage of said at least a portion of the shavings; and a support assembly including at least one support rod and a router mounting assembly, said at least one support rod defining a first end and a second end, said first end supported above said first end of said work table and second end supported above said second of said work table, said router mounting assembly slidably engaging said at least one support rod such that said router mounting assembly is linearly movable between said first end and said second end of said work table, the router being secured to said router mounting assembly such that the router is suspended above said work surface, said router mounting assembly being configured to allow said bit to engage the work piece.

2. The cutting and beveling device of claim 1 wherein said bit defines a blade wherein at least a portion of said blade is tapered.

3. The cutting and beveling device of claim 1 wherein said platform is fabricated to include a material such that magnets are attracted toward said work surface.

4. The cutting and beveling device of claim 3 wherein said platform further defines a central layer and a bottom layer, said work surface being fabricated from a plastic material, said central layer being fabricated from a metal to which magnets are attracted, said bottom layer being fabricated from fiber board.

5. The cutting and beveling device of claim 1 wherein said support assembly further includes a first rod mounting bracket and a second rod mounting bracket, a lower portion of said first rod mounting bracket being secured to said first end of said work table, a lower portion of said second rod mounting bracket being secured to said second end of said work table, said first end of said at least one support rod being secured to an upper portion said first rod mounting bracket, said second end of said at least one support rod being secured to an upper portion said second rod mounting bracket.

6. The cutting and beveling device of claim 1 wherein said router mounting assembly includes at least one rod receiver and a support plate, said rod receiver extending from an upper portion of said support plate and being configured to slidably engage said at least one support rod, the router being secured to said support plate, said support plate defining an opening for allowing said bit to engage the work piece.

7. The cutting and beveling device of claim 1 wherein said vacuum system further includes a vacuum hose secured proximate the router for removing at least a portion of the shavings from above the work piece.

8. A cutting and beveling device for cutting and beveling a work piece, said cutting and beveling device supporting a router to which a bit is releasably secured, said cutting and beveling device comprising:

a work table defining a first end, a second end and a platform, said platform defining a work surface, a central layer and a bottom layer, said platform for supporting the work piece said work surface being fabricated from a plastic material, said central layer being fabricated from a metal to which magnets are attracted, said bottom layer being fabricated from fiber board; and a support assembly including at least one support rod and a router mounting assembly, said at least one support rod defining a first end and a second end, said first end supported above said first end of said work table and second end supported above said second of said work table, said router mounting assembly slidably engaging said at least one support rod such that said router mounting assembly is linearly movable between said first end and said second end of said work table, the router being secured to said router mounting assembly such that the router is suspended above said work surface, said router mounting assembly being configured to allow said bit to engage the work piece.

9. The cutting and beveling device of claim 8 wherein said bit defines a blade wherein at least a portion of said blade is tapered.

10. The cutting and beveling device of claim 8 wherein said support assembly further includes a first rod mounting bracket and a second rod mounting bracket, a lower portion of said first rod mounting bracket being secured to said first end of said work table, a lower portion of said second rod mounting bracket being secured to said second end of said work table, said first end of said at least one support rod being secured to an upper portion said first rod mounting bracket, said second end of said at least one support rod being secured to an upper portion said second rod mounting bracket.

11. The cutting and beveling device of claim 8 wherein said router mounting assembly includes at least one rod receiver and a support plate, said rod receiver extending from an upper portion of said support plate and being configured to slidably engage said at least one support rod, the router being secured to said support plate, said support plate defining an opening for allowing said bit to engage the work piece.

12. The cutting and beveling device of claim 8 wherein said work table further defines a slotted opening for receiving at least a portion of the shavings resulting from the work piece being cut and beveled, said slotted opening extending between said first end and said second end of said work table proximate a center of said work table below a linear path of said bit.

13. The cutting and beveling device of claim 12 wherein said work table further defines a vacuum system for removing said at least a portion of the shavings received in said slotted opening.

14. The cutting and beveling device of claim 13 wherein said vacuum system includes a plurality of vacuum conduits in communication with said slotted opening for removing said at least a portion of the shavings received in said slotted opening.

15. The cutting and beveling device of claim 14 wherein said vacuum system further includes a vacuum hose secured proximate the router for removing at least a portion of the shavings from above the work piece.

* * * * *